Sept. 11, 1951  H. R. FOSTER ET AL  2,567,280
VARIABLE CONDENSER
Filed July 21, 1950

INVENTORS
HARRY R. FOSTER
ELMO E. CRUMP
BY
A. D. T. Libby
Attorney

Patented Sept. 11, 1951

2,567,280

UNITED STATES PATENT OFFICE 2,567,280

VARIABLE CONDENSER

Harry R. Foster, Montville, and Elmo E. Crump, West Caldwell, N. J., assignors to Ohmega Laboratories, Pine Brook, N. J.

Application July 21, 1950, Serial No. 175,236

3 Claims. (Cl. 175—41.5)

This invention relates to the construction of a very small variable condenser which is especially adapted for use in high frequency oscillator circuits particularly in balanced oscillators which are highly useful for apparatus used in television work.

We have found from our development and manufacture of testing equipment for television apparatus that in present commercial types of condensers the capacitance is too great and they have heretofore been made with a ground return, the same being a metallic contact which has given a lot of trouble. Another difficulty with the present day commercial condensers for television work is that when made of thermo-plastic materials used as the dielectric, that when connections are soldered thereto, this material changes shape and ruins the condenser.

It is therefore the principal object of our invention to furnish a condenser for the use heretofore described, which will give excellent control and ease in tuning. Also ease in manufacture and hence the device will be small and relatively inexpensive.

As a matter of principle, it is known that when condensers are connected in parallel the total capacity is the sum of each of the capacities, but when connected in series for example two condensers of equal capacity, the total is one-half of one of the condensers hence by utilizing a construction in which the unit is composed of two series condensers we can get a very small capacity suitable for the purpose. The construction which we have developed is set forth in the annexed drawing in which the views are substantially twice the size of a working unit and wherein Figure 1 is a side view of the device;

(The stator portion being shown in section while the rotor is in elevational.)

Figure 1:
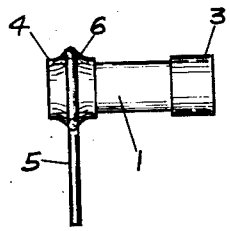
Figure 2:
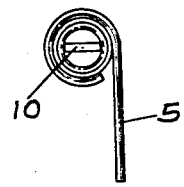
Figure 2 is an end view of Figure 1 looking from right to left.
Figure 3:
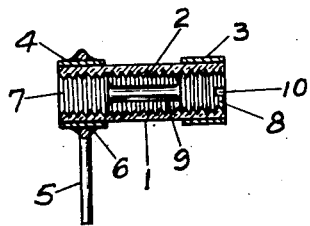
Figure 3 is a part sectional and part elevational view of the device shown in Figure 1.
Figure 4:
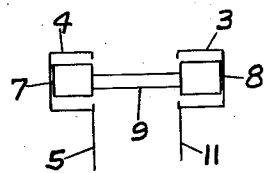

Figure 4 is a diagrammatical view showing the series connections of the two portions making up the condenser unit.

In the different views wherein like numbers refer to corresponding parts, 1 is a tube of suitable insulating materials such as Bakelite. The tube has threads 2 extending internally longitudinally of its length. Mounted on the exterior and at the opposite ends of the tube 1 are metal rings or collars 3 and 4 to which terminal conductors 5 are attached as by soldering, at 6. As shown, the terminal 5 passes all the way around the ring 4. The connection with ring 3 is omitted in order to further show the ring 3 per se but it is to be noted or understood that a terminal connection is the same as 5. Fitting within the interior of the tube 1 is a rotor having two end portions 7 and 8 interconnected by a small rod portion 9 that is of a reduced diameter. It is to be noted that the portions 7 and 8 of the rotor are threaded to engage the threads on the interior of the tube 1 and these portions are substantially the same length as the length of the rings 3 and 4. The rotor has a slot 10 therein to receive an adjusting tool to position the rotor at various places within the tube 1. From Figure 4 it will be seen that there are two small capacity condensers being made up of the ring 3 and the portion 8 of the rotor while the other is made up of the ring 4 and the portion 7 of the rotor, the two portions 7 and 8 being interconnected by the small rod portion 9 thereby connecting the two condensers in series giving a very low capacity between the terminal 5 and its associate 11 extending from the ring 3, it being understood that the tube 1 is the dielectric forming part of both condensers.

From this construction it will be seen that the condenser unit is very easy to make and rigid in construction and very easy to adjust when desired.

Furthermore, the threaded arrangement between the two parts of the rotor and the dielectric is such that the rotor will maintain any adjusted position for an indefinite period and by using this series arrangement we can get a capacity to meet all the requirements of the high frequencies used in the television bands.

Having thus described our invention, what we claim is:

1. A condenser comprising an internally threaded tube of suitable insulating material, a metallic ring anchored around the tube at each end thereof and having current conductors connected thereto and a metallic tuning device having spaced threaded parts engaging the threads on said tube said spaced parts being of approximately the same length as the rings and being interconnected by a portion of much reduced diameter than the threaded parts for capacitatively co-operating with said rings as said device is turned.

2. An adjustable condenser unit of very low capacity including a stator tube of suitable insulating material having its interior surface screw threaded with a metal ring on each of its outer ends, a rotor comprising a single piece metallic rod having enlarged threaded end portions spaced apart the same distance as said rings and connected by a portion of much less diameter than said threaded portions and forming therewith two condensers electrically connected, in series by said rod portion, between said enlarged portions, to form said unit.

3. A very low capacity condenser comprising a short and small diameter tube of suitable insulating material threaded internally at least at both ends, a relatively narrow metallic ring anchored around each outer end of the tube over said threads and adapted to have current conductors connected thereto, a single piece adjustable metallic tuning core substantially the same length as said tube and having threaded portions on its opposite ends interconnected by a portion of much smaller diameter than the threaded ends to adjustably cooperate capacitatively with the threaded ends of said tube and said rings thereon.

HARRY R. FOSTER.
ELMO E. CRUMP.

REFERENCES CITED

The following references are of record in the file of this patent:

UNITED STATES PATENTS

| Number | Name | Date |
|---|---|---|
| 1,592,554 | Burns | July 13, 1926 |
| 2,154,778 | Schnell | Apr. 18, 1939 |
| 2,219,003 | Braunschweig | Oct. 22, 1940 |
| 2,326,341 | Ehlers | Aug. 10, 1943 |
| 2,505,287 | Gutterman | Apr. 25, 1950 |

FOREIGN PATENTS

| Number | Country | Date |
|---|---|---|
| 647,016 | France | July 23, 1928 |
| 541,712 | Great Britain | Dec. 8, 1941 |
| 235,852 | Switzerland | May 1, 1945 |